United States Patent [19]
Haertig

[11] 3,897,098
[45] July 29, 1975

[54] CORNER GUIDES
[76] Inventor: William Milton Haertig, 173 Vernal Dr., Alamo, Calif. 94507
[22] Filed: Apr. 15, 1974
[21] Appl. No.: 460,796

[52] U.S. Cl............................ 294/81 SF; 294/67 R
[51] Int. Cl.²............................................ B66C 1/66
[58] Field of Search ............ 294/67 R, 67 B, 67 BB, 294/67 D, 67 DA, 81 R, 81 SF, 88

[56] References Cited
UNITED STATES PATENTS
2,781,136  2/1957  Sehn et al........................ 294/88 X
3,151,904  10/1964  Tantlinger et al.............. 294/67 DA
3,453,017  7/1969  Nagy.................................. 294/67 R Primary Examiner—Richard A. Schacher
Assistant Examiner—Johnny D. Cherry
Attorney, Agent, or Firm—Bruce & McCoy

[57] ABSTRACT

Improved retractable corner guides for mounting on the corners of a lifting spreader, each of said guides being comprised of an inverted funnel section which can be independently retracted to a position above and within the perimeter of the lifting spreader by means of a rack and pinion gear.

1 Claim, 8 Drawing Figures

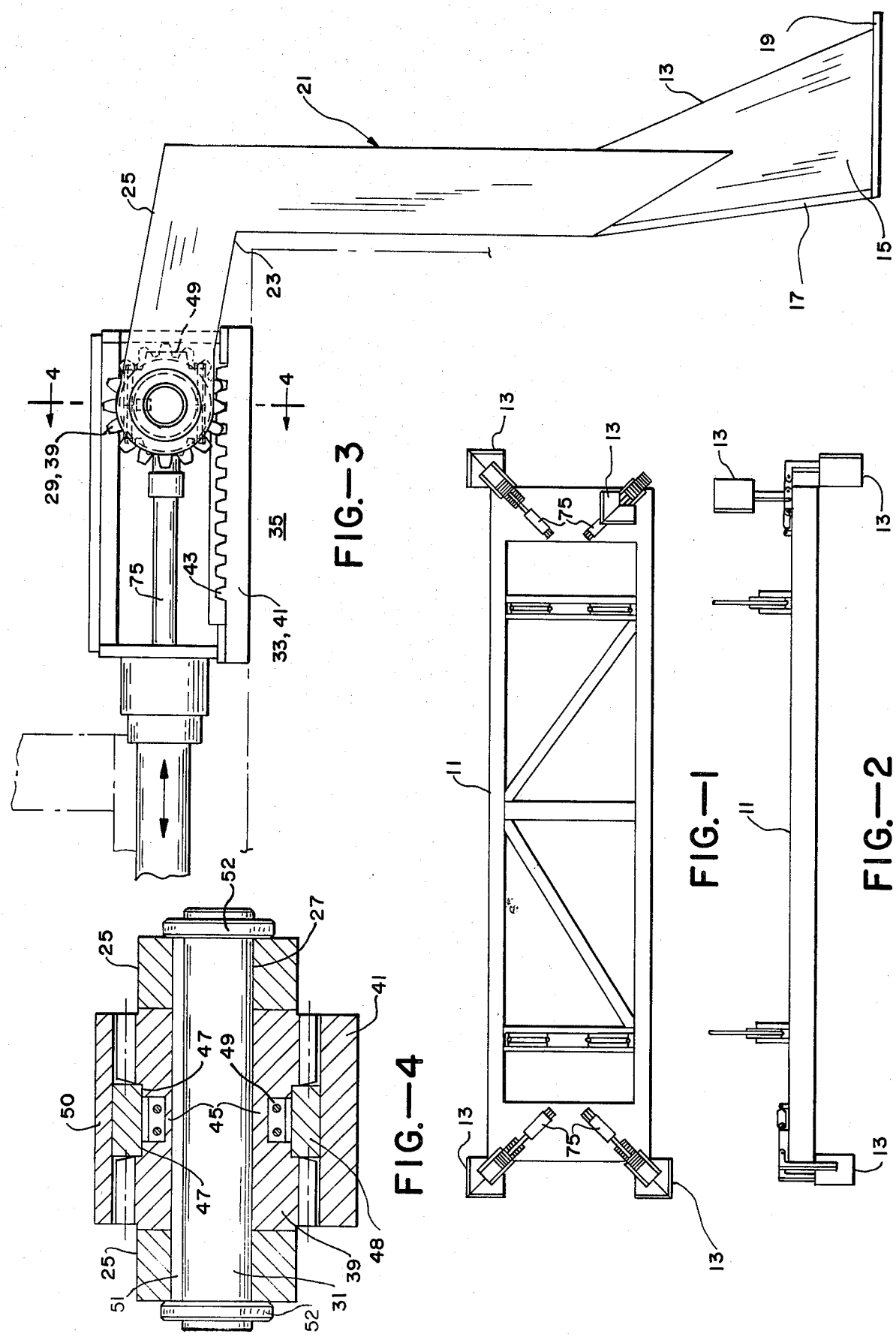

CORNER GUIDES

BACKGROUND OF THE INVENTION

1. Field of the Invention

The present invention relates to guide means for positioning a cargo container lifting spreader over a cargo container for engagement therewith and more particularly to independently operable improved corner guides.

2. Description of the Prior Art

The loading and unloading of cargo transported by ships, railroad cars, and flatbed trailer trucks, has been accomplished by various types of crane devices. Presently, efficient handling of large sized cargo is being effected by the use of cargo containers which are loaded at the factory, moved to dockside by a flatbed trailer or railroad car, and then loaded directly on board ship as a single unit. These cargo containers are handled by special large cranes equipped with devices called lifting spreaders which are suspended from a crane by wire ropes to engage the tops of a cargo container. Using this lifting spreader, the cargo containers can be quickly engaged and then lifted and moved for stacking in layers at dockside or on board ship.

The efficient handling of a cargo container is affected by the speed with which a crane operator can position the lifting spreader over the top of the cargo container to engage the cargo container for lifting. When the crane operator swings a lifting spreader into position over a cargo container, the lifting spreader cannot be immediately engaged with the container because the spreader's momentum causes the flexible wire rope suspension system to swing with a pendulum motion. Once this pendulum motion subsides or is arrested, and the lifting spreader is accurately aligned with the cargo container, the lifting spreader is then lowered onto the cargo container for proper engagement.

To increase the efficiency of the cargo container handling operation, it is necessary to reduce the time required for engaging the lifting spreader with the cargo container. One way to reduce this time is to provide a means for guiding the lifting spreader onto the cargo container such that the crane operator does not have to wait until the pendulum motion completely subsides.

Corner guides can be used for this purpose. However, because cargo containers are often tightly packed in adjacent stacks, or are closely fitted into a cell guide arrangement on a ship where there is little or no room to maneuver outside the periphery of the container itself, the lifting spreaders must have a perimeter configuration which is no greater than, and which preferably closely corresponds to, the perimeter of the cargo container. Hence, situations where containers are tightly packed present a problem if corner guides are to be used, since the corner guides increase the effective perimeter of the lifting spreader.

For this reason, the corner guides must be capable of being retracted to a position within the lifting spreader perimeter to avoid any interference with adjacent container structures or surrounding objects where such containers, structures or objects are present. If adjacent containers are only stacked on one side of the containers to be lifted, the corner guides on the accessible side of that container can be employed in operating position while the corner guides on the side presenting the interference can be independently retracted. In this manner, only those corner guides which correspond to an accessible corner of the cargo container are utilized.

The problem, then, is to provide a corner guide which is fully retractable to a position above the lifting spreader such that the guides will not interfere with any adjacent structures. If, when the crane operator lowers the lifting spreader for engagement with a cargo container located in a tightly packed situation, the corner guides should knock against some adjacent structure, the large forces resulting from the weight of the spreader, would cause the corner guide or the adjacent structure to be damaged. Therefore, to avoid such an accident, it is important that the corner guides be retracted within the perimeter of the lifting spreader as far as possible.

Nagy, U.S. Pat. No. 3,453,017, discloses a corner guide arrangement having guides which can be pivoted from their operative position to an upright position over the lifting spreader. By simply pivoting the corner guides to their position over the lifting spreader, the Nagy invention allows for little error with respect to possible interference of the guides with closely surrounding containers or other structures. For example, the lifting spreader sometimes tips slightly due to the stretching of the lifting ropes. When this occurs the retracted corner guides of Nagy will tilt slightly such that the corner guides disposed on the lower corners of the lifting spreader will project slightly outside of the lifting spreader perimeter. The present invention provides an improved corner guide which overcomes this problem by providing a means for retracting the corner guides more completely within the lifting spreader perimeter. Therefore, the possibility of damaging the corner guides as well as an adjacent structure is sharply reduced.

SUMMARY OF THE INVENTION

The present invention provides an improved retractable corner guide for a lifting spreader comprised of an inverted funnel section which in operative position depends down from the corner of the lifting spreader. The inverted funnel section is secured to one end of an L-shaped connecting arm, and the other end of the L-shaped connecting arm is secured to the pinion gear of the rack and pinion gear combination. The flat rack gear of the rack and pinion gear is mounted on the top of said lifting spreader at a corner thereof and is formed to mate with the pinion gear which is secured to the connecting arm. Guide means are provided for maintaining the pinion gear in engaged relation with the rack gear as it rotates therealong, and a push-pull actuation means is provided which is adapted to power the pinion gear of the connecting arm. The arrangement provides combined rotational and translational movement of the pinion gear along the rack gear whereby the inverted funnel section can be rotated in a vertical plane by means of the connecting arm while concurrently being translated on a line coincident with the alignment of the rack gear for combined rotation and translation from the operative position to a position above and retracted within the perimeter of the lifting spreader.

OBJECTS OF THE INVENTION

It is therefore an object of the present invention to provide an improved corner guide for guiding a cargo container lifting spreader to a position for proper engagement with the top of the cargo container.

It is another object of the present invention to provide improved corner guides which can be independently retracted to a position within the perimeter of the cargo containers such that only those corner guides are used corresponding to accessible corners of the cargo container.

It is a further object of the present invention to provide improved corner guides which can be rotated above as well as being retracted by translation within the perimeter of the lifting spreaders in order to reduce the possibility of damage to the corner guides or to an adjacent structure.

And, it is still another object of the present invention to provide improved corner guides for a cargo lifting spreader which will increase the efficiency of stacking and unstacking cargo containers on ships, railroad cars, or flatbed trailer trucks.

Other objects and advantages of the present invention will become apparent when the corner guides of the present invention are considered in conjunction with the accompanying drawings.

DESCRIPTION OF THE DRAWINGS

FIG. 1 is a top plan view of a cargo container lifting spreader showing three of the four improved corner guides in operating position and one in retracted position;

FIG. 2 is a side-elevation view of the cargo container lifting spreader shown in FIG. 1;

FIG. 3 is a side-elevation view of an improved corner guide with the corner guide in operative position;

FIG. 4 is a cross-sectional view of version 1 of the rack and pinion gear taken along line 4—4 of FIG. 3;

DESCRIPTION OF THE PREFERRED EMBODIMENT

Figure 5:
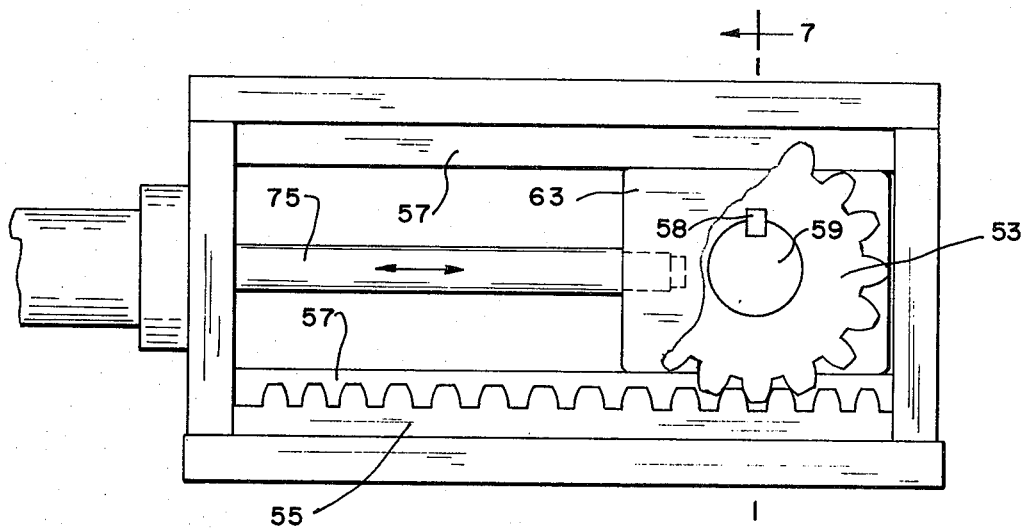
FIG. 5 is a partial cut-away side elevation view of version 2 of the rack and pinion gear.

Referring now to the drawings, the improved corner guides of the present invention are mounted on the corners of the lifting spreader 11. Each of these corner guides has an inverted funnel section 13 which in operative position depends downward from the lifting spreader. The funnel section is designed to cradle the corner of a cargo container for guiding the lifting spreader onto the top of a cargo container so that it can be engaged by the spreader for lifting.

The inverted funnel sections include a pair of angled side plates 15 which intersect and angle inward at their ends to form the preferable shape of an inverted square funnel which has been diagonally sectioned. Two vertical flange portions 17 project outwardly from the inverted funnel section in a plane which is generally parallel to the diagonal cross-sectioning plane.

Horizontally disposed flanges 19 are secured to the lower edges of the inverted funnel section and intersect the vertical flange portions 17 to form a continuous skirt along the funnel sections edges. This continuous skirt functions to prevent the inverted funnel sections from inadvertantly puncturing the top or sides of the cargo containers and also to provide structural rigidity to the funnel section.

A connecting arm 21 is provided for each funnel section. It is generally L-shaped and inverted preferably having an angle at its elbow 23 of slightly greater than 90°. The inverted funnel sections 13 are secured to the lower end of the L-shaped connecting arms 21. Preferably, the inverted funnel sections are welded to the connecting arms, however, other means of attachment may be used. The other or second leg of the L-shaped connecting arm opposite the end to which the inverted funnel section is secured is comprised of two parallel pivotal leg members 25. Co-axial holes 27 are formed in the end portions of the pivotal legs perpendicular to the plane of the L of the L-shaped connecting arm. These holes form the pivotal axis of the connecting arm around which the connecting arm is rotated for raising and lowering the inverted funnel section.

A pinion gear 29 is secured to the second end of the connecting arm opposite the inverted funnel section 13. The pinion gear is disposed between the pivotal leg members 25 of the L-shaped connecting arm and is keyed for rotation therewith by a keyed shaft 31 disposed along the axis of the pinion. In FIG. 4, the keyed shaft is shown to extend beyond the sides of the pinion to engage with the holes formed in the pivotal legs of the connecting arm. Although the preferred embodiment shows the pinion disposed between two pivotal leg members, other arrangements for securing the pinion to the end of the connecting arm are possible.

The pinion gear 29 meshes with a flat rack gear 33 which is mounted on top of a corner of the lifting spreader 11. Similar flat rack gears are mounted at each of the other corners of the spreader. The pinion and flat rack gear combine to form a rack and pinion gear combination 35 which is aligned such that the pinion 29 travels over the rack gear 33 on a line which generally bisects the 90° angle formed by the corner of the lifting spreader.

Three different versions of the rack and pinion gear are described herein, any one of which can be incorporated into the preferred embodiment.

The first version of the rack and pinion gear is shown in FIGS. 3 and 4. This first version is comprised of a double integral pinion 39 having two gear portions which mesh with a double flat rack gear 41 having two sets of teeth 43 formed parallel to each other on the base portion of the rack gear. The two gear portions of the double pinion are connected and made integral by a tubular center section 45 disposed along the axis of the pinion. Oppositely opposed shoulders 47 are formed concentric with the pinion gear on the inner side of the two gear portions of the double pinion gear. These shoulders are of a suitable diameter and spacing to fit over the internal corners of the guide means which are provided for maintaining the pinion gear in engaged relation with said rack gear as the pinion rolls therealong. The guide means includes a pair of guide tracks 48 with a lower guide track positioned in the middle of the flat rack gear 41 and an upper guide track secured to a cover plate 50. As a result of these guide tracks, the double pinion gear is held in captured relation with respect to and meshes with the rack gear and is free to roll along the lower guide key.

The tubular center section 45 connecting the two gear portions of the pinion 39 is journalled to a yoke 49 which is disposed between the gear portions of the pinion. The yoke reciprocates or translates but does not rotate with the pinion as the pinion travels along the rack gear. The yoke thus serves as a means of connecting the pinion to the push-pull activation means, more fully described below.

The parallel pair of pivotal legs 25 of the connecting arm 21 are disposed on either side of the double pinion and are secured to rotate with the double pinion by a shaft 31 having a key portion 51. This keyed shaft runs through both the axial bore in the pinion and the holes in the end portions of the pivotal arms of the connecting arm 21. Preferably, the shaft is held into place by two lock nuts 52 as shown in FIG. 4.

Figures 7, 8:
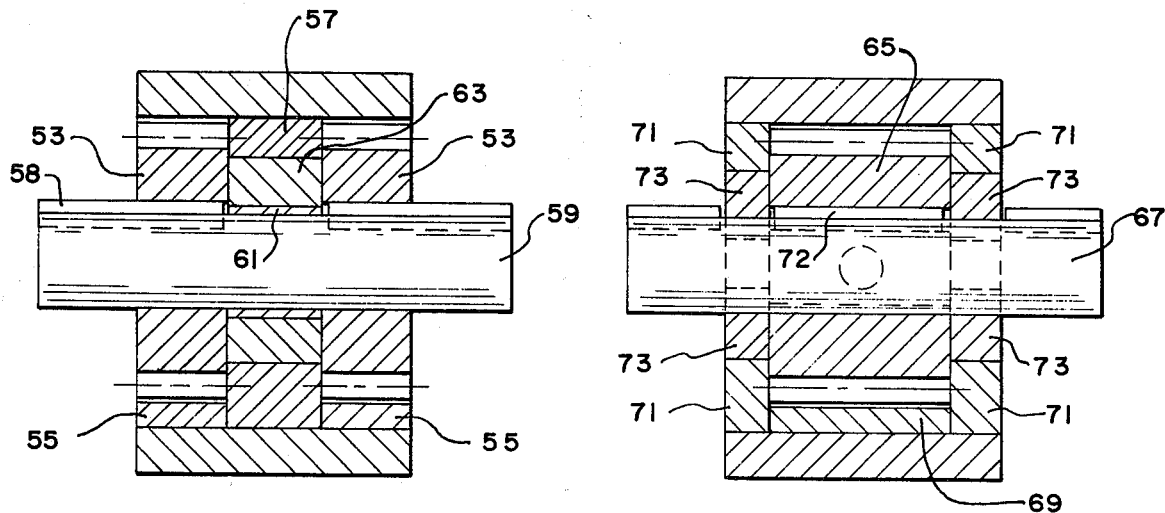
FIG. 7 is a cross-sectional view taken along line 7—7 of FIG. 5.
FIG. 8 is a cross-sectional view taken along line 8—8 of FIG. 6.

Referring to FIGS. 5 and 7 of the drawings, the second version of the rack and pinion gear is comprised of two identical pinions 53 meshing with two rack gears 55 disposed on opposite sides of a pair of centrally located guide tracks 57. These guide tracks consist of an upper and lower track and like the first version of the rack and pinion gear described above functions to guide the pinion down the rack gear. However, this configuration differs from the first version in that there is no shoulder on the two pinion gears which overlap the guide track, and also there is no integral connection between the two pinions. Rather, in this second version the pinions are separately keyed with key member 58 to a shaft 59 which shaft is journalled by means of a bearing 61 with respect to a guide block 63 disposed between the pinions. The guide block 63 slides along the guide track 57 as the pinions are drawn along the rack gear.

Figure 6:
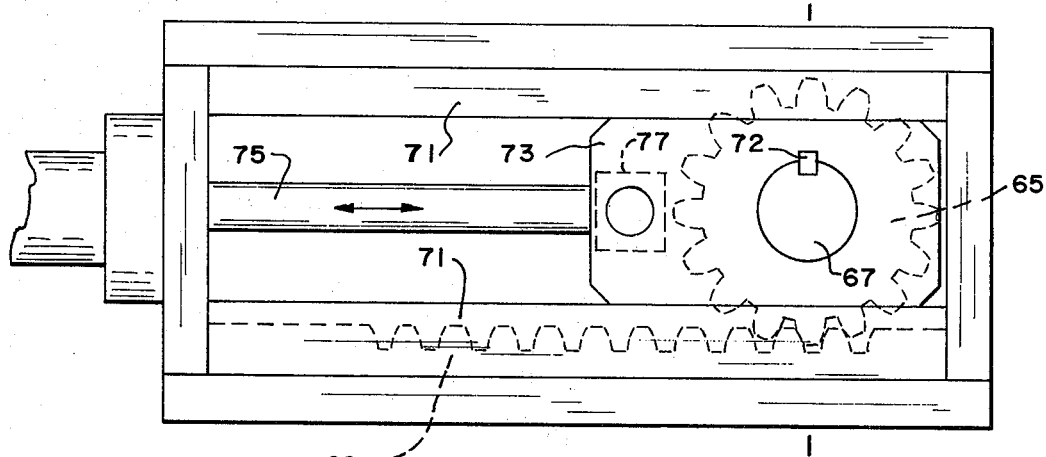
FIG. 6 is a partial side-elevation view of version 3 of the rack and pinion gear.

The third version of the rack and pinion gear is illustrated in FIGS. 6 and 8. This version consists of a single, centrally located pinion 65 keyed to a shaft 67 running along the axis thereof. The pinion gear meshes with a centrally located rack gear 69 and two pair of guide tracks 71 are mounted on opposite sides of the rack gear and pinion combination holding the pinion in captured relation on the rack gear. The shaft, which is keyed by a key member 72 to the pinion gear, is journalled with respect to two guide keys 73 and engages with the connecting arm pivotal legs disposed on opposite sides of the pinion. The guide keys are disposed between their respective pair of guide tracks and slide with respect to these guide tracks as the pinion moves along the rack gear.

Independently operable push-pull actuation means, such as hydraulic cylinders 75, draw the pinion gears along the rack and pinion gear assembly. The cylinders have one end secured to the lifting spreader and the other end to the yoke 49 of the rack and pinion gear, or the guide keys 63, 73 depending on which version of the rack and pinion gear is used. In the third version of the rack and pinion gear shown in FIGS. 6 and 8, the end of the hydraulic cylinder is attached to a pull bar 77 disposed between the two guide keys 73.

The push-pull operation of the cylinder moves the pinion gear along the rack gear thereby causing translational movement of the inverted funnel section and connecting arm in a direction coincident with alignment of the rack and pinion gear, while at the same time rotating the inverted funnel section and connecting arm from an operative depending position to a position above and within the perimeter of the lifting spreader. FIGS. 1 and 2 show one of the inverted funnel sections retracted to an upwardly protecting position for an angular displacement of 180° from its depending position. The present invention is not limited to this embodiment, however, for the design may be such that the inverted funnel section can be rotated up to approximately 270° from its depending position so that it projects inwardly from the lifting spreader perimeter. The degree of retraction can further be increased by increasing the length of the rack gear and the extent of reciprocation in the hydraulic cylinder. Because of the independent operation of the cylinders, any one or all of the funnel sections can be rotated independent of the others, and because the rack and pinion gear combines translational with rotational movement, the inverted funnel sections can be retracted to a position within and remote from the perimeter of the lifting spreader.

The invention operates to expedite the unloading of ships or railroad cars or flatbed trailers or to stack or unstack cargo containers at a storage area. When the lifting spreader is lowered onto a cargo container, the funnel sections guide the spreader into correct alignment with the container. If the spreader is mating with a cargo container which has all four upper corners exposed, the four inverted funnel sections are lowered to depend from the lifting spreader, and then are used to guide the lifting spreader into a proper engaging relation with the container.

When it is desired to lower the cargo container into the hold of a ship which is provided with cell guides, the four inverted funnel sections are rotated to an upward position such that they are disposed inside the perimeter of the spreader and do not interfere with the cell guides. With the inverted funnel sections in this retracted position, the containers can be freely lowered into the tightly fitting cells. The cell guides are usually provided in the form of right angle vertical guide bars.

When it is desired to remove a single container from stacks of other cargo containers which are stacked closely adjacent to each other, the inverted funnel sections are raised or lowered to provide a suitable combination of depending corner guides that will not interfere with adjacent containers. If only one corner of the cargo containers is accessible, the funnel section at that corner is lowered into an operative position while the remaining three funnel sections are retracted well within the periphery of the lifting spreader. If two or more upper corners of the container are accessible, then the funnel sections corresponding to those accessible corners are placed in an operative position.

The guides of the present invention is an improvement on the prior art in that the retractable corner guides of the lifting spreader are fully and more completely retractable into a position within and remote from the perimeter of the lifting spreader by providing a rack and pinion gear as a means for effecting the retraction. A translational movement is thus introduced onto the pivotal movement to retract the corner guides generally toward the center of the lifting spreader. In this manner, the corner guides can be safely retracted to a position away from the perimeter of the lifting spreader thereby decreasing the possibility of the corner guides being damaged due to interference with protruding objects or structures such as containers situated closely adjacent to the cargo containers being lifted.

While the present invention has been illustrated and described in considerable detail, the invention is not to be limited to such details as have been set forth except as may be necessitated by the appended claims.

I claim:

1. Improved retractable corner guides for a lifting spreader each comprising, an inverted funnel section which in operative position depends down from a corner of the lifting spreader, an L-shaped connecting arm secured to said funnel section and having a pinion gear secured to the other end thereof in fixed relation thereto, one leg of said L-shaped connecting arm being formed by two parallel pivotal leg members disposed on opposite sides of said pinion, said pivotal leg members having slotted co-axial holes formed in the ends thereof perpendicular to the plane of said L-shaped connecting arm, and said pinion having a keyed shaft disposed along its axis and extending beyond the sides thereof for engagement with said slotted holes formed in the ends of said pivotal leg members of said connecting arm whereby said connecting arm is keyed to said pinion gear to rotate therewith, a flat rack gear mounted on said lifting spreader at the top thereof generally on a line which bisects the 90° angle formed by the corner of the lifting spreader, said flat rack gear being formed to mesh with said pinion gear secured to said connecting arm, a guide means for maintaining said pinion gear in engaged relation with said rack gear as it rotates therealong, and a hydraulic cylinder secured to said spreader and engaged in journalled relation with said pinion, said hydraulic cylinder being adapted to power the pinion gear for combined rotational and translational movement of said pinion gear along said rack gear whereby said inverted funnel section can be rotated in a vertical plane by means of said connecting arm while concurrently being translated on a line coincident with the alignment of the rack gear for rotation and translation from the operative position to a position above and retracted from the perimeter of the lifting spreader.

* * * * *